US007569254B2

United States Patent
Rao et al.

(10) Patent No.: US 7,569,254 B2
(45) Date of Patent: *Aug. 4, 2009

(54) NANOCOMPOSITE MATERIALS COMPRISING HIGH LOADINGS OF FILLER MATERIALS AND AN IN-SITU METHOD OF MAKING SUCH MATERIALS

(75) Inventors: YuanQiao Rao, Pittsford, NY (US); David B. Bailey, Webster, NY (US); Samuel Chen, Penfield, NY (US); Nancy L. Furbeck, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 11/208,564

(22) Filed: Aug. 22, 2005

(65) Prior Publication Data

US 2007/0042174 A1 Feb. 22, 2007

(51) Int. Cl.
*B32B 5/02* (2006.01)
*B32B 5/16* (2006.01)
*B32B 27/20* (2006.01)
*B32B 27/30* (2006.01)
*B05D 3/00* (2006.01)

(52) U.S. Cl. .................. 427/385.5; 427/331; 427/372.2; 427/384; 427/377; 427/407.1; 428/323; 428/328; 428/329; 428/330; 428/402; 428/500; 428/522; 428/532

(58) Field of Classification Search ........................ None
See application file for complete search history.

(56) References Cited

U.S. PATENT DOCUMENTS

| 4,528,311 | A | | 7/1985 | Beard et al. | |
|---|---|---|---|---|---|
| 5,010,128 | A | * | 4/1991 | Coltrain et al. | 524/405 |
| 5,312,484 | A | * | 5/1994 | Kaliski | 106/446 |
| 6,187,427 | B1 | * | 2/2001 | Taylor-Smith et al. | 428/305.5 |
| 6,387,519 | B1 | * | 5/2002 | Anderson et al. | 428/447 |
| 6,419,989 | B1 | * | 7/2002 | Betz et al. | 427/385.5 |
| 6,593,417 | B1 | * | 7/2003 | Anderson et al. | 524/588 |
| 6,599,631 | B2 | | 7/2003 | Kambe et al. | |
| 6,610,777 | B1 | * | 8/2003 | Anderson et al. | 524/588 |

(Continued)

FOREIGN PATENT DOCUMENTS

EP 0509327 10/1992

(Continued)

OTHER PUBLICATIONS

H. I. Elim, et al., "Ultrafast Optical Nonlinearity in Poly(methylmethacrylate)-$TiO_2$ Nanocomposites," Applied Physics Letters, vol. 82, No. 16, Apr. 21, 2003, pp. 2691-2693.

(Continued)

*Primary Examiner*—Vivian Chen
(74) *Attorney, Agent, or Firm*—Chris P. Konkol; J. Lanny Tucker

(57) ABSTRACT

A method of fabricating a nanocomposite material includes generating nanoparticles in-situ with a polymer. A nanocomposite material includes a polymer having nanoparticles characterized by a shorter dimension of not more than 50 nm and elongated strands or dense packing.

24 Claims, 3 Drawing Sheets

U.S. PATENT DOCUMENTS

| | | | |
|---|---|---|---|
| 6,623,791 B2 * | 9/2003 | Sadvary et al. | 427/140 |
| 6,635,341 B1 * | 10/2003 | Barancyk et al. | 428/323 |
| 6,656,990 B2 | 12/2003 | Shustack et al. | |
| 6,657,001 B1 * | 12/2003 | Anderson et al. | 524/588 |
| 6,712,997 B2 * | 3/2004 | Won et al. | 252/503 |
| 6,803,408 B2 * | 10/2004 | Anderson et al. | 524/588 |
| 7,217,754 B2 * | 5/2007 | Koloski et al. | 524/430 |
| 7,344,895 B2 * | 3/2008 | Kohler et al. | 436/523 |
| 2004/0044127 A1 | 3/2004 | Okubo et al. | |
| 2007/0042137 A1 * | 2/2007 | Rao et al. | 428/1.3 |
| 2007/0254107 A1 * | 11/2007 | Rao et al. | 427/372.2 |

FOREIGN PATENT DOCUMENTS

| | | |
|---|---|---|
| FR | 2854406 | * 11/2004 |
| WO | 90/11323 | 10/1990 |
| WO | 02/08343 | 1/2002 |
| WO | WO 2004/017341 | * 2/2004 |

OTHER PUBLICATIONS

Long-Hua Lee, et al., "High-Refractive-Index Thin Films Prepared from Trialkoxysilane-Capped Poly(methyl methacrylate)-Titania Materials," Chem. Mater. 2001, 13, 1137-1142.

* cited by examiner

NANOCOMPOSITE MATERIALS COMPRISING HIGH LOADINGS OF FILLER MATERIALS AND AN IN-SITU METHOD OF MAKING SUCH MATERIALS

FIELD OF THE INVENTION

The present invention relates to a novel nanocomposite materials and to a method of fabricating such nanocomposite material by the in-situ generation of nanoparticles in a polymer matrix.

BACKGROUND

Nanocomposite materials are comprised of two or more materials, with at least one of the materials including particles having no dimension greater than about several hundred nanometers (nm). Polymer-based nanocomposite materials include a filler material of nanoparticles dispersed in the matrix of the polymer material.

Nanocomposite materials have garnered interest in many technical fields requiring materials for optical, electronic, structural, and barrier applications. One reason for this interest is the potential to combine certain material characteristics of the polymer with those of the filler material. For example, many polymers are transparent and can be used in optical applications. However, in many optical applications it is often useful for the materials to have indices of refraction, or other optical properties, that are different than those of many polymers suitable for optical applications. For example, it would be beneficial to be able to provide a nanocomposite material having a filler material that increases the index of refraction of the material to a desired level, but does not have a significant adverse impact on the transparent nature of the polymer.

Nanocomposites can also be used to provide other material properties. For example, the mechanical properties of tensile strength and compressibility can be altered over those of the unfilled polymer. Beneficially, stronger and more durable materials can be made for structural applications. Moreover, the barrier and thermal properties of the polymer may be altered to a desired end via the incorporation of nanoparticles. Such nanocomposite materials may be used in disparate applications such as construction and packaging.

While polymer-based nanocomposite materials are promising, there are shortcomings in known nanocomposite materials and their methods of manufacture. For example, in order to achieve certain material characteristics and uniformity of these characteristics, it is beneficial for the nanoparticles to be homogeneously dispersed within the other polymer material of the nanocomposite. Often, this requires mixing at the nanometer scale level. However, the nanoparticles and the polymer material often have little or no affinity for one another. Thus, the mixing at the nanometer scale level is difficult to achieve.

Known attempts to address the difficulties presented by the lack of compatibility of the nanoparticles and the polymer material include surface treatment of the nanoparticles prior to mixing with the polymer. For example, U.S. Pat. Nos. 6,599,631 and 6,656,990 describe blending a polymer and inorganic particles to form hybrid materials. Specially prepared particles with well-controlled particle size and surface treatment of the particles are required.

Additionally, methods involving mechanical stressing have been used in an attempt to achieve a desired particle size or a more homogeneous dispersion of the particles within the polymer. Known methods include forced mixing using an extruder and injection molding. Unfortunately, such methods may result in the agglomeration of the nanoparticles. Thus, by many known methods of fabricating nanocomposite materials, the domain size of the nanoparticles is on the order of micrometers, which is too great for certain applications.

US Patent No. 2004/004127 to Okubo et al. discloses a polymeric nanocomposite film comprising a cellulose derivative and a polycondensation product of a condensation polymerizable reactive metal compound (but also including compounds containing silicon instead of a "metal" in the conventional sense used herein). The nanocomposite film further contains a plasticizer in an amount of 1 to 20 weight percent by weight. Example 1 of Okuba et al. involves casting a dope comprising titanium tetramethoxide in admixture with methylene chloride, ethanol, silica, and cellulose triacetate polymer. The materials comprise a relatively small amount of the metal alkoxide (less than 4 weight percent) compared to the amount of polymer. Furthermore, as shown in Table 1-1 of the patent, the amount of the polycondensation product in the nanocomposite was not more than 1.5% for metal-oxide nanoparticles, although as high as 20 percent for silicon. Also, as shown in Table 1-2, the average particle size (diameter) of the polycondensation product in the nanocomposite was not less that 90 nm (as measured by small-angle X-ray diffraction) for metal-oxide particles, although nanoparticles as small as 8 nm were obtained when the nanocomposite comprised mixtures of a metallic oxides and silicon oxides, the metallic oxides present in relatively small amounts.

It is believed that the larger size of the metallic oxide nanoparticles in the nanocomposites of Okubo et al., when the polycondensation product consisted only of the metallic oxides, was at least in part due to the relatively higher reactivity of the metallic-oxide precursors compared to the silicon-oxide precursors. Similarly, the lower concentration of the metallic oxides used in the nanocomposites may have been due to agglomeration of the more reactive metal-oxide precursors to the extent that the transparency of the nanocomposite was adversely effected. The concentration of the polycondensation product that could be used by Okubo et al. in the nanocomposites based on metallic oxides was, therefore, severely limited as compared to nanocomposites based on non-metallic oxides such as silicon dioxide.

Significantly, Okubo et al. did not find it necessary to prevent the metal-oxide precursors from reacting in the dope used to make the films. Instead, Okubo et al. state that the condensation polymerization of the reactive metal compound can be carried out in the solution (dope) containing the reactive metal compound or in a web formed on the support, but is preferably carried out in the solution. Evidence supports the conclusion that the reaction of the relatively reactive metal compound in Okubo et al. occurred to a significant extent prior to coating. This is believed to account for the fact that relatively higher concentrations of the metal-oxide nanoparticles (substantially greater than 1.5 weight percent) and/or relatively smaller sizes of the metal-oxide nanoparticles particles (with at least one dimension significantly less than 90 nm) could not be obtained by Okubo et al.

In view of the above, a problem in prior art techniques for fabricating polymer-based nanocomposites is that, with respect to the nanoparticles of a desired material, they may fail to achieve the level of homogeneity desired, the desired loading levels, the desired size of the nanoparticles, or a combination of these deficiencies. Likewise, obtaining polymer-based nanocomposites having desired optical or other properties have been a problem.

It would be desirable to obtain a nanocomposite comprising smaller metallic oxide nanoparticles and/or higher concentrations of the nanoparticulate material in a transparent nanocomposite, particularly a nanocomposite used to make an optical film. What is also needed is a method of fabricating nanocomposite materials that overcomes the shortcomings of the techniques previously discussed.

SUMMARY

The present invention is directed to a nanocomposite film comprising nanoparticles dispersed in a polymer matrix, which nanoparticles are the product of a condensation polymerizable reactive metal oxide compound, comprising a metallic atom and at least two hydrolyzable leaving groups, wherein the nanocomposite comprises an effective amount at least 5 weight percent of nanoparticles including a plurality of representative nanoparticles having a shorter dimension of not more than 50 nm, as evident by transmission electron microscopy (TEM). Preferably, the nanoparticles are present at a concentration between 5.0 and 25.0 percent by weight of the nanoparticulate condensation product in the nanocomposite. Preferably, the representative nanoparticles are the most representative nanoparticles in the TEM in terms of visibly well-defined morphology characteristics.

The nanoparticles can be in the form of elongated strands or closely packed blocks or nano-regions, which may depend on the concentration of the nanoparticulate condensation product and the particular materials used to make the nanocomposite. In either case, however the nanocomposite comprises a plurality of nanoparticles having a shorter dimension (or width, in the plane of the TEM, opposite the length) of not more than 50 nm.

The nanoparticles may be present in the form of nano-regions defined by darkly contrasting metal-oxide nanoparticulate material against a lighter background of pure polymer. The nanoparticulate material in the nano-regions may be mixed, or flocculated, to some extent with the polymer, in a gradient decreasing in metal-oxide towards the boundaries of the nano-region, resulting in indistinct or diffuse boundaries of the nanoparticles in a TEM micrograph. Distinctly bounded individual particles may be substantially absent from the TEM micrograph, in comparison to the nanoparticles in other nanocomposites.

In one embodiment, nanocomposites comprise a plurality of nanoparticles, as determined by electron transmission microscopy, in the form of elongated strands, the width of which is substantially uniform along the elongation, the width being in the range of 5 to 50 nm, preferably 10 to 25 nm. In another embodiment, nanocomposites comprising densely packed nanoparticles, a plurality of which nanoparticles are characterized, as determined by electron transmission microscopy, by having a shorter dimension of not more than about 50 nm and all dimensions less than 200 nm.

As used herein, the term "nanoparticle" includes regions of a nanocomposite material that is rich in metal oxide constituent used to make nanoparticles. The term "nanoparticle" will, therefore, refer to nano-regions or domains of nanoparticulate material that form against the background of a TEM micrograph, which can be defined by dark contrast rather than clear boundaries. The nanoparticles should have a morphology that does not significantly or unduly influence the transparency of the film product. The TEM micrographs used to determine the size or morphology of the nanoparticles must be representative samples.

By the term "shorter dimension" of a nanoparticle is meant that dimension (or width) in the direction perpendicular to the longer dimension (or length) through the center of the particle, in the plane of the TEM micrograph. The shorter dimension is substantially the same along the longer dimension, for example, typically within about 25 percent of the average width. Preferably, the "maximum shorter dimension" along the longer dimension is likewise not more than 50 nm and meets the same size limitations as the "shorter dimension" in the present invention.

In accordance with another aspect of the present invention, a method of fabricating a nanocomposite material, as described above, includes generating inorganic nanoparticles in-situ within a polymer matrix by:

(a) forming a coating solution of a nanoparticle precursor and polymer dissolved in a substantially non-aqueous carrier liquid, comprising one or more organic solvents, wherein the nanoparticle precursor is a condensation polymerizable reactive metal compound comprising a metallic atom and at least two hydrolyzable leaving groups;

(b) applying the coating solution onto a substrate to form a film and then removing organic solvent from the coating solution to form a gel;

(c) converting the nanoparticle precursor, by hydrolysis and polycondensation reactions, into nanoparticles in the polymer matrix to form a nanocomposite; and (d) drying the nanocomposite to remove remaining organic solvent from the nanocomposite, wherein the nanocomposite is characterized by a plurality of such generated inorganic nanoparticles having a shorter dimension of not more than 50 nm, at a concentration of at least 5.0 percent by weight of the nanoparticulate condensation product in the nanocomposite.

BRIEF DESCRIPTION OF THE DRAWINGS

The embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
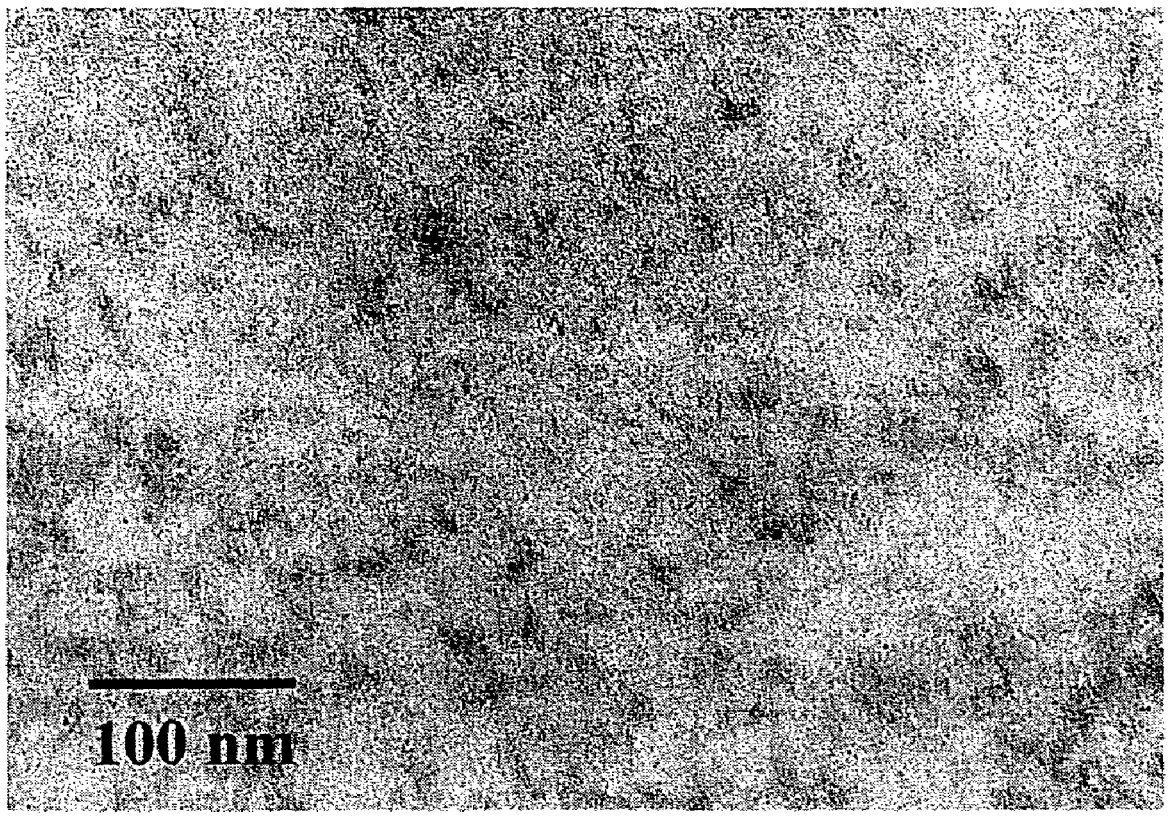
FIG. 1 is a transmission electron microscopy (TEM) image of one embodiment of a nanocomposite material in accordance with Example 1 of the invention.

The invention has been described with reference to preferred embodiments. However, it will be appreciated that variations and modifications of such embodiments can be effected, by a person of ordinary skill in the art, without departing from the scope of the invention.

Briefly, the present invention relates to nanocomposite materials, comprising nanoparticles dispersed in the matrix of a polymer material, and methods of fabricating such nanocomposite materials. Notably, the nanoparticles are formed in-situ within the polymer material. In accordance with one embodiment of the method, a polymer material and a nanoparticle precursor are mixed in an organic solvent, which can comprise mixtures, to form a coating solution. The solvent substantially dissolves the polymer and substantially prevents the nanoparticle precursor molecules from reacting with one another in the coating solution. Beneficially, agglomeration of the nanoparticle precursor or a subsequent intermediate product is substantially avoided in the coating solution.

In accordance with one embodiment of the present method, a nanocomposite material is made by generating inorganic nanoparticles in-situ within a polymer matrix as follows:

(a) forming a coating solution of a nanoparticle precursor and polymer dissolved in a substantially non-aqueous carrier liquid, comprising one or more organic solvents, wherein the nanoparticle precursor is a condensation polymerizable reactive metal compound comprising a metallic atom and at least two hydrolyzable leaving groups, and wherein the components of the coating solution are selected such that the nanoparticle precursor is essentially stable and unreacted prior to applying the coating solution onto a substrate to form a film;

(b) applying the coating solution onto a substrate to form a liquid-fluid coating and then removing organic solvent from the coating to form a gel;

(c) converting the nanoparticle precursor, by hydrolysis and polycondensation reactions, into nanoparticles in a matrix of the polymer to form a nanocomposite; and (d) drying the nanocomposite to remove remaining organic solvent from the nanocomposite (during which further condensation reaction may occur), wherein the nanocomposite, in the final product, is characterized by the presence of a plurality of nanoparticles having a shorter dimension of not more than 50 nm, at a concentration of at least 5.0 weight percent by weight of the nanoparticulate condensation product in the nanocomposite. The plurality of nanoparticles are characterized by elongated strands or dense packing.

Without wishing to be bound by theory, it is believed that the formation of such nanoparticles is obtained by substantially delaying their formation until a gel of the polymer material is formed, after the organic solvent is evaporated to some extent, while the nanoparticle precursor is homogenously mixed in a matrix of the polymer. By slowing its diffusion in the gel, the polycondensation product is prevented from aggregating into larger particles. Reaction of the nanoparticle precursor or an intermediate product, and especially nanoparticle formation, should be avoided before coating, preferably before gelling. Similarly, it is preferred that nanoparticles greater than 5 nm, more preferably nanoparticles greater than 2 nm, are substantially absent from the coating solution prior to coating, more preferably prior to gelling of the coated solution.

Obtaining a homogenous mixture of the nanoparticles and delaying their formation and/or aggregation in the film can be achieved or promoted by a variety of factors, such as the use of (1) a relatively less reactive precursor, (2) a polymer more interactive or compatible with the precursor or intermediate during nanoparticle formation, (3) a more favorable solvent as described below, and/or (4) an alcohol to prevent or limit premature hydrolysis. Avoiding (or limiting) the use of a catalyst can also be a factor in obtaining the present nanocomposite, particularly with more reactive precursors. Another factor that can be used to obtain the present nanocomposite is controlling (or limiting) the presence of water necessary for the hydrolysis of the precursor. For example, reaction can be delayed by strictly excluding water from the coating solution and, instead, introducing water into the coated film by employing ambient humidity, as explained below. The ratio of water to precursor can affect the speed or timing of nanoparticulate formation.

Undesirable reaction or nanoparticle formation, not sufficiently delayed, may be evidenced by relatively larger particle size of the nanoparticles and, in the case of coating on a moving web, by elongation of the nanoparticles in the direction of web movement, indicating nanoparticles already substantially formed in the coating solution when applied to the moving web.

Because of their highly reactive nature, transition metal alkoxides and the like can undergo hydrolysis with the assist of gaseous water (moisture), and without a catalyst or catalysts. In one preferred embodiment, the nanoparticle precursors used in the present method, after coating a homogenous mixture thereof on a substrate, are subjected to a hydrolysis reaction that is carried out employing ambient humidity to provide the water necessary for hydrolysis in the coating. Accordingly, the water necessary for hydrolysis is preferably not contained in the coating solution prior to coating. The hydrolysis fosters the conversion of the nanoparticle precursor to a nanoparticle intermediate. A further condensation reaction produces the nanocomposite material. As will become clearer as the present description continues, the hydrolysis and condensation reactions do not necessarily occur sequentially, but rather may occur substantially simultaneously.

Preferably, the coating solution used to form the reaction mixture for the nanocomposite comprises the nanoparticle precursor in an amount of at least 5 weight percent relative to the total polymer, preferably in an amount of 6 to 33 weight percent. Typically, the coating solution is applied to a substrate by curtain coating, casting or other conventional or known techniques to form a nanocomposite material. The term "coating" is used in a generic sense to all these methods for making a thin film of the coating solution.

The present method further includes removing solvent after applying the coating solution to a substrate, which may be a moving web. Illustratively, the removal of the solvent occurs substantially continuously after forming a film of the coating solution, in accordance with a preferred embodiment. However, the removal of the solvent, after forming the solution, may occur either substantially continuously or in discrete steps or stages. Optionally solvent may be partially removed prior to forming the film, as long as the gel point of the coating solution is not reached before forming the film.

The solvent is preferably removed relatively rapidly, so that the gel point is reached before substantial reaction or aggregation of the precursor in the coating. Relatively rapid removal of the solvent, thus, helps to produce and substantially preserve the homogenous dispersion of the particles that are formed.

Hydrolysis and condensation are effected during the removal of solvent from the coating solution. Preferably, inappreciable, if any, hydrolysis or condensation is effected in the solution before a sufficient amount of solvent is removed to create a gel mixture. Accordingly, the bulk of the hydrolysis and condensation preferably occurs when the solvent-depleted solution is in the gel form. (As indicated above, the hydrolysis and condensation, although sometimes described as sequential steps or reactions, are usually concurrent to some extent.)

In a preferred embodiment, the nanoparticle precursor is reacted in the absence of a catalyst. Catalysts are to be avoided when the nanoparticles precursor is a very reactive organometallic compound. However, for relatively less reactive nanoparticle precursor compounds, an effective amount of catalyst can be added to the coating solution, although it may still be desirable to exclude water from the coating solution, so that the nanoparticle formation is delayed until after a gel is obtained.

Catalyst refers to a chemical compound that changes the reaction kinetics in the formation of the nanoparticles. For example, catalysts may include an acid or base compound. More specifically, catalysts may include acetic acid, HCl, nitric acid, KOH, amines and others known to those skilled in the art.

The addition of amounts of liquid water directly to the coating solution should be avoided with respect to the preferred nanoparticles precursors, in order to prevent premature conversion to nanoparticles. Preferably, the total amount of water necessary for hydrolysis of the nanoparticle precursor has not been added to the coating solution prior to coating. More preferably, the water is preferably added to the coating in sufficiently small or trace amounts after a gel containing the dispersed precursor has formed. Water should be carefully controlled, however, because it acts not only as a reactant for hydrolysis, but also as an initiator. Water is also by-product of the condensation.

As mentioned above, a preferred method for controlling hydrolysis of the nanoparticle precursor in the coating solution is to add water for hydrolysis from controlled humidity in the environment, which water can be drawn into the gel either through vapor diffusion or condensation at the surface of the coated solution where solvent is being evaporated.

By using humidity as a source of water for hydrolysis, the coating solution can comprises less than 25 weight percent, relative to the nanoparticle precursor, of water, preferably less than 10 weight %. (In contrast, US Patent No. 2004/004127 to Okubo et al., in Example 1, employs 45%, although 0.2% based on total solution in view of the low amount of nanoparticle precursor and resulting nanoparticles.)

In one preferred embodiment, in which the nanoparticle precursor is a transition metal alkoxide, the moisture content of the environment is suitably in the range of about 1.0% relative humidity (RH) to about 80.0% RH. In one particular embodiment, the relative humidity is about 5.0% to about 50.0% RH.

In any case, the addition of water, in any form (liquid or humidity), to generate nanoparticles, or a gel thereof, before the nanoparticle precursor is homogenously dispersed in the polymer matrix of the solution should be avoided. As mentioned above, the nanoparticle precursor and/or intermediate thereof is preferably in a gel of the polymer matrix before substantial conversion to the nanoparticles occurs.

The hydrolyzed precursor becomes more hydrophilic as it is hydrolyzed and tends to clump together away from the relatively hydrophobic polymer. Although the hydrolysis is very fast, the diffusion of the hydrolyzed precursor or intermediate in the solution is very slow when a gel is formed, thereby maintaining dispersion of the particle precursor or intermediate in the polymer matrix of the gel, prior to conversion into nanoparticles. The nanoparticles that are formed are, thereby prevented from aggregating too much.

A gel point is reached in the coated solution (i.e., liquid coating prior to solidification) due to the polymer forming tangled chains as solvent is evaporated. The viscosity of the solution is increased by polymer chain entanglement before the precursor is extensively converted to particles, thereby limiting or slowing diffusion of the nanoparticle precursor or intermediates. Diffusion of the nanoparticle precursor or intermediates can also limited by gelation in which the metal alkoxide or other type of precursor reacts to form a three dimensional structure that prevents flow. However, an extended chain cluster of the precursor is preferably limited prior to gel formation by polymer entanglement, since otherwise the polymer may coil back due to incompatibility of the cluster with the precursor.

A gel is characterized by a physical integrity and a viscosity above $10^6$ cp at an oscillating frequency of $1\ s^{-1}$ using a dynamic rheometer.

As mentioned above, another aspect of the present invention relates to a nanocomposite film comprising nanoparticles dispersed in a polymer matrix, which nanoparticles are the product of a condensation polymerizable reactive metal oxide compound, comprising a metallic atom and at least two hydrolyzable leaving groups. The nanocomposite is characterized by the presence of a plurality of nanoparticles having a shorter dimension of not more than 50 nm, as evident by transmission electron microscopy (TEM). The total concentration of nanoparticles in the nanocomposite is at least 5.0 percent by weight, as determined according to thermal gravimetric analysis, or less approximately on a theoretical basis assuming 100 percent yield of the precursor to the metal oxide condensation product. Preferably, the concentration of the nanoparticles is 5.0 to 25 percent by weight of the nanocomposite, more preferably 10 to 20 percent by weight of the nanocomposite.

The nanoparticles can be in the form of elongated strands or closely packed nano-regions, which may depend on the concentration of the nanoparticulate condensation product and the particular materials used to make the nanocomposite. In any case, the nanocomposite according one embodiment of the present invention is characterized, as evident by transmission electron microscopy (TEM), by indistinctly bounded nanoparticles having a shorter dimension, or width, in the plane of the TEM, of not more than 50 nm.

The nanoparticles according to the present invention can be in the form of nano-regions showing dark contrast and indistinct boundaries in a TEM micrograph. In one particular embodiment, nanocomposites according to the present invention comprise a plurality of nanoparticles in the form of elongated strands, the width of which is substantially uniform along the elongation, the width being in the range of 5 to 50 nm, preferably 10 to 25 nm. In a second particular embodiment, nanocomposites according to the present invention comprise nanoparticles, as determined by electron transmission microscopy, that are densely packed, including a plurality of nano-regions having a shorter dimension of not more than about 50 nm and all dimensions less than 200 nm. Preferably, more than 50 percent of the TEM micrograph shows darkly contrasting regions, indicating a mixture of metal oxide with polymer.

In the case of nanocomposites characterized by elongated strands, the nano-regions may appear in the form of, or may be described as, filamentous clouds, woolly threads, and/or short chains of beads. In the case of nanocomposites characterized by densely packed nano-regions, the nano-regions may appear in the form of, or may be described as, roughly rectangular or block-like, in which at least two sides are mostly substantially flat. Since the nanoparticle may have a different (usually darker) electron density than the matrix of the polymer, a density gradient can form and less distinct boundaries for the nanoparticles or nano-regions results. Separate nano-regions can occasionally blend into each other, which may be either fact or appearance, for example if nano-regions of different depth appear in the same plane.

Without wishing to be bound by theory, less distinct nanoparticles or cloudy nano-regions in the nanocomposite may be very fine particles under 5 nm, more probably under 2 nm, that may have flocculated but have not fully condensed or aggregated to larger or particles, thereby resulting is some mixture or metal oxide with polymer. The interface of the nanoparticle and the matrix of the polymer, as defined by the electron density contrast can be gradual rather than abrupt. In the case of abrupt electron density change, there is a sharp interface and a traveling electromagnetic wave experiences two different media; while in the case of gradual electron density change, the interface is more subtle, and the traveling electromagnetic wave experiences more continuous alternation such that, for example, the scattering due to the change in refractive index can be reduced. Thus, in the present embodiments, it is beneficial that the electron density contrast is more gradual.

The nanoparticle precursor used to make the present nanocomposite may be a metal alkoxide, metal acetate, metal acetylacetonate, or halogenated metal. Preferably, however, the precursor is an organometallic compound.

In accordance with one preferred embodiment, the metal atom in the nanoparticle precursor is a transition metal. The transition metal may be Ti, Ta, Zr, Zn, Ta, Hf, Cr, V and W. Alkaline-earth metals, rare-earth metals and Group 3B, 4B and 5B metals are also useful. For example, the metal may be a non-transition metal such as Al, Tl, Sn, Sb, Ba, In, Pb and Ge. Barium, a Group 2A metal, may also be used. (Metals are defined to include elements that are electrically conductive in the pure state and do not include elements that form semiconductors or insulators such as silicon.) Preferred metals are aluminum, indium, tin, titanium, zirconium, and hafnium. The nanoparticles in the present nanocomposite, resulting from the reaction of such nanoparticle precursors, are substantially comprise the corresponding oxides of these metals, as will be readily understood by the skilled artisan.

Preferably, nanoparticle precursors comprising silicon instead of a metallic atom are substantially absent from the coating solution used to make the nanocomposite.

Illustratively, ligands or groups that are hydrolyzed include alkoxide, acetate, and halogen. Preferably, the leaving or hydrolyzable groups in the precursor compound contain three to six carbon atoms.

Illustratively, optional substituents that are not hydrolyzed include, for example, substituted or unsubstituted alkyl groups and substituted or unsubstituted aryl groups. The substituents of the alkyl group and the aryl group can include an alkyl group (for example, a methyl group, an ethyl group, etc.); a cycloalkyl group (for example, a cyclopentyl group, a cyclohexyl group, etc.); an aralkyl group (for example, a benzyl group, a phenyl group, etc.); an aryl group (for example, a phenyl group, a naphthyl group, etc.); a heterocyclic group (for example, a furanyl group, a thiophenyl group, a pyridyl group, etc.); an alkoxy group (for example, a methoxy group, an ethoxy group, etc.); an aryloxy group (for example, a phenoxy group, etc.); an acyl group; a halogen atom; a cyano group; an amino group; an alkylthio group; a glycidyl group; a glycidoxy group; a vinyl group; a fluorine-containing alkyl group; and a fluorine-containing aryl group.

For example, titanium-containing compounds useful as a nanoparticle precursor include titanium methoxide, titanium ethoxide, titanium isopropoxide, titanium-n-butoxide, tetrachlorotitanium, titanium diisopropoxide(bis-2,4-pentanedionate), titanium diisopropoxide(bis-2,4-ethylacetoacetate), titanium di-n-butoxide (bis-2,4-pentanedionate), titanium acetylacetonate, titanium lactate, titanium triethanolaminate, and a butyltitanium dimer.

Examples of a zirconium-containing compounds useful as a nanoparticle precursor include zirconium ethoxide, zirconium isopropoxide, zirconium n-propoxide, zirconium-n-butoxide, zirconium tri-n-butoxide acetylacetonate, zirconium tri-n-butoxide bisacetylacetonate, zirconium acetylacetonate, zirconium tetraiodide and zirconium acetate.

Examples of an aluminum-containing compound useful as a nanoparticle precursor include aluminum ethoxide, aluminum isopropoxide, aluminum-n-butoxide, aluminum-s-butoxide, aluminum-di-s-butoxide acetylacetonate, aluminum-t-butoxide, alumatrane, aluminum phenoxide, aluminum acetylacetonate, and aluminum ethylacetylacetonate.

Examples of other metal-containing compounds useful as nanoparticle precursors include barium isopropoxide, calcium ethoxide, copper ethoxide, magnesium ethoxide, manganese methoxide, strontium isopropoxide, tin ethoxide, zinc methoxyethoxide, trimethoxyborane, triethoxyborane, antimony ethoxide, arsenic triethoxide, bismuth t-pentoxide, chromium isopropoxide, erbium methoxyethoxide, gallium ethoxide, indium methoxyethoxide, iron ethoxide, lanthanum isopropoxide, neodymium methoxyethoxide, praseodymium methoxyethoxide, samarium isopropoxide, vanadium tri-isobutoxide, yttrium isopropoxide, tetramethoxygermane, tetraethoxygermane, tetraisopropoxygermane, tetra-n-butoxygermane, cerium t-butoxide, hafnium ethoxide, hafnium-n-butoxide, tellurium ethoxide, molybdenum ethoxide, niobium ethoxide, niobium-n-butoxide, tantalum methoxide, tantalum ethoxide, tantalum-n-butoxide, tungsten (V) ethoxide, tungsten (VI) ethoxide, and tungsten (VI) phenoxide.

Two or more kinds of precursors, for example different metal alkoxides, may be added to the coating solution used to make the present nanocomposites, within the content range described above. In addition, the nanoparticle precursor may be a double metal alkoxide that has two metal atoms in the molecule. Examples of the double metal alkoxide include aluminum copper alkoxide, aluminum titanium alkoxide, aluminum yttrium alkoxide, aluminum zirconium alkoxide, barium titanium alkoxide, barium yttrium alkoxide, barium zirconium alkoxide, indium tin alkoxide, lithium nickel alkoxide, lithium niobium alkoxide, lithium tantalum alkoxide, magnesium aluminum alkoxide, magnesium titanium alkoxide, magnesium zirconium alkoxide, strontium titanium alkoxide, and strontium zirconium alkoxide. The double metal alkoxide is preferably one having a metal selected from the group consisting of aluminum, titanium and zirconium. In accordance with the present invention, after the in-situ processing, a nanocomposite can be formed that optionally includes double metal oxide nanoparticles (e.g., barium titanium oxide nanoparticles). The nanoparticle precursor is selected to be compatible with the polymer. The compatibility of the inorganic-particle precursor fosters its interaction with, or bonding to, the polymer or its residing within the matrix of the polymer, as described further below.

Metal oxide nanoparticles are formed from the precursor by hydrolysis and condensation reactions in which a hydrogenated leaving group is a removable product from the reaction between hydrolyzed nanoparticle intermediates. The initial condensation can occur simultaneously with the hydrolysis. Final condensation preferably occurs with the evaporation of the solvent by heating. The final condensation may be completed even after the completion of the removal/drying of the solvent. Further heat treatment can be optionally employed to anneal the final nanoparticles. The amount of water in the material, the temperature, and the solvent all affect the kinetics of the condensation. Certain illustrative process parameters are provided in the Examples below.

At the completion of the condensation step, the nanoparticle may include hydroxyl surface groups, or ligand surface groups, or both. Solid state NMR can be used to determine the amount of such surface groups. Compared to prior-art nanoparticles made by laser ablation or other high temperature processes, the present nanoparticles have higher amounts of such surface groups, for example, unreacted leaving groups.

More specifically, hydrolysis is an exchange reaction that produces a nanoparticle intermediate comprising the metal with one or more hydroxide groups bonded thereto. The resulting nanoparticle intermediate may be an association of molecules surrounded by a polymer matrix. Both hydroxyl groups and ligand groups may be present in the intermediate. A condensation reaction occurs when hydroxy groups in the nanocomposite intermediate react.

In one preferred embodiment, the nanoparticle precursor is an organometallic material, for example, a metal alkoxide given by the formula:

$$R^1_y M(OR)_x \quad (1)$$

wherein M is a metal, n is the valence of the metal M, which is typically 2 to 5, preferably 3 or 4; x=2 to n and y=0 to n-x; and R and $R^1$ are each independently selected organic substituents. In one preferred embodiment, the nanoparticle precursor is $R^1_y M(OR)_x$, where y=0 and x=4, that is, $M(OR)_4$. In one preferred embodiment, the precursor is a titanium alkoxide, more preferably, a titanium alkoxide in which the alkoxide has 3 to 6 carbon atoms.

In a preferred embodiment, all R groups are the same. In one particularly preferred embodiment x=2, 3, or 4 and y=0, 1, or 2. Preferred R groups are each independently alkyl or substituted alkyl having 1 to 12 carbon atoms. Preferred $R^1$ groups are substituted or unsubstituted alkyl, allyl, acrylate, and acetoacetate.

In one particularly preferred embodiment, involving a metallic alkoxide precursor, the reaction sequence for transforming nanoparticle precursor to nanoparticles can be schematically illustrated, in which a typical hydrolysis reaction is as follows:

$$R^1_y M(OR)_x + H_2O \rightarrow R^1_y M(OR)_{x-1}OH + ROH \quad (2)$$

Similarly, a typical condensation reaction is as follows:

$$X\text{---}OH + HO\text{---}Y \rightarrow X\text{---}O\text{---}Y + H_2O \quad (3)$$

wherein X and Y are independently reaction intermediates of the nanoparticle precursor, which may include the intermediate on the right side of equation (2) or condensation and/or hydrolysis products thereof. Thus, the compound or material X—O—Y can be in the form of a three dimensional network with OH, OR, or $R^1$ end groups.

This reaction sequence occurs in the presence of the polymer in the mixture, resulting in a nanocomposite of the nanoparticles in a polymer matrix, thereby forming a substantially homogeneous nanocomposite material structure.

Accordingly, the nanoparticle precursor undergoes hydrolysis in which one or more OR groups are converted to one or more OH groups, preferably at least two OH groups prior to condensation. This hydrolysis, thus, forms a nanoparticle intermediate that comprises one or more hydrolyzed metal alkoxides, a plurality of which can associate in the solution. Alcohol is formed as a reaction side product. The hydrolyzed metal alkoxide nanoparticle intermediate can then be condensed to form the nanoparticles. Metal hydroxides can initially form oligomers of metal oxides that eventually are built into the final nanoparticles.

In one preferred embodiment, the precursor is a titanium alkoxide, more preferably, a titanium alkoxide in which the alkoxide has 3 to 6 carbon atoms.

Preferably, the nanoparticles in the form of elongated strands are also characterized by average aspect ratio greater than 5, whereas the nanoparticles present in the dense packing have an average aspect less than 5, in which the maximum diameter is preferably less than about 200 nm, more preferably less than 100 nm, most preferably less than about 50 nm. In optical applications of nanocomposite materials, it is often useful to have nanoparticles having no dimension greater than a fraction of the wavelength of light traversing the nanocomposite. To this end, nanoparticles of the ranges mentioned reduces scattering of light and benefits optical characteristics such as transparency.

For nanoparticles that are characterized by an aspect ratio greater than 5 (elongated strands), the maximum dimension is preferably less than about 400 nm, more preferably less than about 200 nm. In certain embodiments these nanoparticles have maximum dimensions in the range of about 10 to 100 nm. A preferred minimum dimension in the non-elongated or shorter direction of such nanoparticles can vary from 1 nm to 10 nm.

Considerations when choosing the solvent for the coating solution include the solubility of the polymer in the solvent as well as the ability to stabilize the nanoparticle precursor to prevent premature reaction of the nanoparticle precursor and its intermediates. Such stabilization is particularly desirable in the case of metal alkoxide precursors, which may be very reactive, and especially transition metal alkoxides which may be relatively highly reactive. The solvent can affect the kinetics of the hydrolysis and condensation reactions.

Since the metal oxide has a weaker affinity with polymer than the precursor, stabilization of the precursor and its intermediate prior to formation of gel is desirable to prevent agglomeration.

As such, the solvent is useful in preventing the nanoparticles in the nanocomposite from reaching unacceptable size and fostering the formation of nanoparticles of relatively smaller dimensions.

The solvent can be selected to provide the polymer with the desired solubility, for example, based on a measurable solubility parameter $\chi$. The term 'solubility parameter' refers to the polymer-solvent interaction parameter, $\chi$, which is defined in the following equation:

$$\Delta G_m = RT[n_1 \ln \phi_1 + n_2 \ln \phi_2 + n_1 \phi_2 \chi] \quad (4)$$

where: $\Delta G_m$ is the Gibbs energy of mixing; T is the temperature; R is a known constant; and subscripts 1 and 2 refer to the polymer and solvent, respectively; n is the molar fraction; and $\phi$ is the volume fraction. Notably, the lower the value of $\Delta G_m$, the more favorable the interaction is between the polymer and the solvent. Therefore, a lower $\chi$ represents a good interaction. Numerous techniques can be used to measure $\chi$ such as scattering, vapor pressure methods, and similar methods. The value of $\chi$ may also be calculated based on information from standard references known to the skilled artisan. Preferably, the solubility parameter is less than about 1.0.

The solvent used in the coating solution solvates or dissolves the polymer and the nanoparticle precursor. Preferably, the solvent provides a solution of the polymer in which the polymer chains can fully extend and, more preferably, in which the extended polymer chains can sufficiently interact with the inorganic particle precursor to contribute to the homogenous dispersion of the precursor and its intermediates.

The solvent can be one or more of a variety of known organic solvents. The solvent can be polar or nonpolar, depending on the other components of the coating solution. For example, polar solvents include alcohols, glycols, amides, ethers, ketones and halogenated organic solvent, whereas nonpolar solvents include benzene, xylene, and dioxane. Some solvents can be used possessing intermediate polarity such as THF and ethanol.

Examples of good solvents include ketones such as acetone, methyl ethyl ketone, cyclopentanone, and cyclohexanone; ethers such as tetrahydrofuran (THF), 1,4-dioxane, 1,3-dioxolane, and 1,2-dimethoxyethane; esters such as methyl formate, ethyl formate, methyl acetate, ethyl acetate, amyl acetate, and gamma-butyrolactone; methylcellosolve; dimethylimidazolinone; dimethylformamide; dimethylacetoamide; acetonitrile; dimethylsulfoxide; sulfolane; nitroethane; and methylene chloride. Preferred solvents include butanol, dimethylene chloride, benzene and THF. A mixture of solvents can be used.

Alcohols can be used to protect the ligand or leaving group of a transition metal alkoxide or other relatively reactive nanoparticle precursor, which precursors are reactive and prone to hydrolyze and polymerize. Such alcohols thereby can slow down the hydrolysis and condensation. In a preferred embodiment, the carrier liquid for the coating solution used to make the present nanocomposite comprises an organic solvent that is ethylene glycol or a compound having at least three carbon atoms and at least one hydroxy group, for example, butanol, isopropyl alcohol, or ethylene glycol. Such alcohols are preferably present in the coating solution in minor amounts in combination with one or more other organic solvents. Preferably, the carrier liquid is essentially free of methanol or ethanol, which tend to contain excessive amounts of water.

The concentration of the carrier liquid, or solvent, in the coating solution used to make the present nanocomposite is such that the polymer chain is uncoiled. The concentration of solvent in the coating solution is illustratively in the range of about 1% to about 50% by weight. More illustratively, the concentration is in the range of between about 2% to about 15% by weight.

The polymer (or matrix polymer) used to make the present nanocomposite may be either an addition polymer or a condensation polymer. The matrix polymer of the invention can be any natural or synthetic polymer. The matrix polymer of the invention can be of different architecture: linear, grafted, branch or hyperbranched. The matrix polymer may be a thermoplastic or a thermoset resin. Illustrative of useful thermoplastic resins are cellulose and its derivatives (cellulosic): cellulose ethers such as methyl cellulose, ethyl cellulose, hydroxyethyl cellulose, hydroxypropyl cellulose, and cyanoethyl cellulose, and cellulose esters such as triacetyl cellulose (TAC), diacetyl cellulose (DAC), cellulose acetate propionate (CAP), cellulose acetate butyrate (CAB), cellulose acetate phthalate, cellulose acetate trimellitate and cellulose nitrate. The polymer can include polyolefins such as (linear) low and high density poly(ethylene), poly(propylene), chlorinated low density poly(ethylene), poly(4-methyl-1-pentene), and poly(ethylene) and cyclic polyolefins; poly(styrene); polyxylyene; ; polyimide, vinyl polymers and their copolymers such as poly(vinylcarbazole), poly(vinyl acetate), poly(vinyl alcohol), poly(vinyl chloride), poly(vinyl butyral), poly(vinylidene chloride), ethylene-vinyl acetate copolymers, and the like; polyacrylics their copolymers such as poly(ethyl acrylate), poly(n-butyl acrylate), poly(methylmethacrylate), poly(ethyl methacrylate), poly(n-butyl methacrylate), poly (n-propyl methacrylate), poly(acrylamide), polyacrylonitrile, poly(acrylic acid), ethylene-acrylic acid copolymers; ethylene-vinyl alcohol copolymers; acrylonitrile copolymers; methyl methacrylate-styrene copolymers; ethyleneethyl acrylate copolymers; methacrylated budadiene-styrene copolymers, and the like; polycarbonates such as poly(methane bis(4-phenyl) carbonate), poly(1,1-ether bis(4-phenyl) carbonate), poly(diphenylmethane bis(4-phenyl)carbonate), poly( 1,1-cyclohexane bis(4-phenyl)carbonate), poly(2,2-bis-(4-hydroxyphenyl) propane)carbonate and the like; polyether; polyketone; polyphenylene; polysulfide; polysulfone; polylactones such as poly(pivalolactone), poly(caprolactone) and the like; polyurethanes; linear long-chain diols such as poly(tetramethylene adipate), poly(ethylene adipate), poly(1, 4-butylene adipate), poly(ethylene succinate), poly(2,3-butylenesuccinate), polyether diols and the like; polyether ether ketones; polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (NOMEX), poly(p-phenylene terephthalamide)(KEVLAR), and the like; polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate) (A-TELL), poly(para-hydroxy benzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthlate, polybutylene terephthalate and the like; poly(arylene oxides) such as poly(2,6-dimethyl-1,4-phenylene oxide), poly(2,6-diphenyl-1,4-phenylene oxide) and the like; poly (arylene sulfides) such as poly(phenylene sulfide) and the like; polyetherimides; ionomers; poly(epichlorohydrins); furan resins such as poly(furan); silicones such as poly(dimethyl siloxane), poly(dimethyl siloxane), poly(dimethyl siloxane co-phenylmethyl siloxane) and the like; polytetrafluoroethylene; and polyacetals. Copolymers and/or mixtures of these aforementioned polymers can also be used.

Vulcanizable and thermoplastic rubber materials may also be used as the polymer. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylenepropylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like, as for example the copolymers in poly(styrene)-poly(butadiene)-poly(styrene) block copolymer manufactured by Shell Chemical Company under the trade name of Kraton®. Copolymers and/or mixtures of these aforementioned polymers can also be used.

Preferred matrix polymers include thermoplastic polymers such as vinyl, polystyrene, polyacrylic, and polyxylyene, polyvinylcarbazole, polyester, polyamide, polyimide, polycarbonate, polyether, polyketone, polyphenylene, polysulfide, polysulfone, and cyclic polyolefin.

The polymer used in the coating solution preferably has affinity to the surface of the nanoparticle precursor, nanoparticle intermediate, and/or nanoparticle product, which fosters a more thermodynamically favorable homogenous dispersion. The surface of the nanoparticle typically comprises —OH or ligand groups (for example, an OR group when using an alkoxide precursor), both of which are good electron donors. Thus, the presence of electron-acceptive functional groups on the polymer can provide or enhance affinity of the polymer to the surface of the nanoparticles, including hydrogen bonding. Functional groups in the polymer such as carbonyl, acid, amide and ester are known as strong acceptors of acidic hydrogen and can form hydrogen bonding with the OH groups of the nanoparticle intermediate. These groups can be present either in the backbone, side chain or the terminal end of the polymer, to compatibilize the nanoparticles or intermediate thereof with the polymer matrix.

Additionally, Van der Waals forces can enhance the affinity of the nanoparticles and polymer. Such interactions between the nanoparticles and polymer are believed to aid the homogenous dispersion of the polycondensation product and prevent undesirable agglomeration that can lead to larger particles that can adversely affect transparency of the nanocomposite, resulting in undesirable haze.

The compatibility of the nanoparticle precursor with the polymer can also derive from chemical bonding and coordination.

Reactive functional groups that can be present in the polymer chain to react with the nanoparticle precursor and nanoparticle intermediate, to form chemical bonding, include metal alkoxide functional groups represented by the following formula:

$$-C-M-R_x-OR'_y \quad (5)$$

wherein M is Si or a metal atom selected from the group consisting of Si, Ti, Zr, and Sn; each R and R' are independently an organic moiety; x is 0, 1, 2 or 3, y is 1, 2, 3, or 4 and the sum of x and y is equal or less than 4. Such groups can react with the nanoparticle precursor or nanoparticle intermediate to form a chemical bonding. Other coupling chemistry can be used as well.

The nanoparticles may be useful in providing various desirable characteristics to the nanocomposite. The selection of the nanoparticle factors in the optical, electrical, and mechanical characteristics of the nanocomposite. For example, some transition metal oxides have a relatively high index of refraction, while many polymers do not. Therefore, the nanocomposite may have the desired characteristics of a film with a relatively high index of refraction.

In applications where the resultant nanocomposite material is used in optical applications, a substantially homogeneous index of refraction is provided across substantially the full thickness of material for light of visible wavelengths. When a homogeneous dispersion is formed and the domain size is smaller than the visible light wavelength, the composite refractive index can be calculated through Lorenz-Lorenz relation, and written as:

$$n_c = V_1 n_1 + V_2 n_2 \quad (6)$$

wherein "n" is refractive index, V is volume fraction, and the subscripts 1 and 2 refer to each of the individual components, while the subscript c refers to the nanocomposite material. In this way, higher refractive index materials for certain applications may be realized from polymer materials, for example, useful in the field of display, solid-state lighting and fiber optic communications.

Materials having high indices of refraction have immense applications in optics and photonics due to their ability to reduce reflection losses at interfaces and, hence, increase light output. The use of semiconductor materials in photonics sources, detectors, and other devices has increased the requirements for high index polymers in applications ranging from light-emitting diodes (LEDs) to planar light wave circuits. High-brightness LEDs have garnered much interest lately for myriad applications and potentially as replacements for white light sources. Organic LED materials (OLEDs) typically have a refractive index in the range of 1.7-1.8. When a cover glass with an index of 1.4 to 1.5 is put against the OLED layers, 50% to 70% of the light is trapped within the OLED layers due to internal reflection. As a result, a high refractive index medium between the OLED and air is needed to increase the light extraction efficiency. A material with an index of refraction in the range of 1.7 to 1.8 could definitely increase the light output from such packaged LED sources. Further, for most integrated optics or planar photonic circuits, the material of choice for use with semiconductor materials such as silicon, indium phosphide, and gallium arsenide is a high index material with high index contrast because of optimized losses and the capability of tuning. High index material can also be used for beam splitting applications in diffraction gratings. The high index of refraction would decrease the optical thickness of the gratings, thus facilitating thinner grating structures.

Inorganic materials such as $TiO_2$ and $ZrO_2$ and $SiN$ are commonly used in the applications that call for high refractive index. Here is a table of common high refractive indices for various inorganic materials.

| Material | Refractive index (632 nm) |
|---|---|
| $Sb_2O_5$ | 1.66 |
| $Al_2O_3$ | 1.79 |
| $HfO_2$ | 1.9 |
| $ZrO_2$ | 2 |
| $Ta_2O_5$ | 2.1 |
| $Nb_2O_5$ | 2.3 |
| $CeO_2$ | 2.3 |
| $TiO_2$ | 2.88 |

In contrast, the chemical structure of the polymer matrix in a nanocomposite, which is mainly composed of carbon and hydrogen, determines that the typical refractive index of polymer ranges from about 1.4 to 1.6. (see, for example, Brandrup, Immergut, Grulke, *Polymer Handbook*, Wiley Interscience, VI-571). It is very difficult to make a polymeric material possessing a refractive index higher than 1.65 at 400 nm because of the low electric density of the constituents in polymeric materials. (Van Krevelen, *Properties of Polymers*, pp. 287-318, Elsevier, 1997, New York)

In accordance with a nanocomposite according to the present invention, a material that combines, to a desirable extent, the processability of polymer and the optical property of inorganics can be obtained.

In one embodiment of the present invention, a nanocomposite material of refractive index greater than 1.65, preferably greater than 1.7, at 480 nm is obtained. In a preferred embodiment, the high-index nanocomposite film exhibits a refractive index between 1.65 and 1.95. Preferably, the material exhibits high optical transmittance and is in the form of a flexible film. In accordance with the present invention, inorganic nanoparticles are formed in situ with the presence of polymer matrix. This makes the whole process more versatile and easy.

In one embodiment of a high-refractive-index nanocomposite, the precursor loadings were in the range of 30 to 80 weight percent and the nanoparticles were in the range of 11 to 53 weight percent based on gravimetric analysis.

In one preferred embodiment, in order to better control the size of the inorganic particles and/or the phase separation of the organic/inorganic phase, a copolymer is synthesized that is composed of two different monomers. The first monomer (the main polymer on a molar basis) of the copolymer provides the copolymer component of interest, which exhibits a reasonable index of refraction, and the second or minor monomer of the composition contains a coupling group which can chemically react with the nanoparticle precursor or strongly affiliate with the surface of formed nanoparticle. The copolymer components of interest include: vinyl, polystyrene, polyacrylics, polyxylyene, polyvinylcarbazole, polyester, polyamide, polyimide, polycarbonate, polyether, polyketone, polyphenylene, polysulfide, polysulfone and cyclic polyolefin. The second monomer can be a compatibilizing monomer comprising a pendant group on a styrene, acrylic, xylyene, vinylcarbazole, or vinylpyrrolidinone. In a preferred embodiment, the pendant group on the compatibilizing monomer is provided with a metal or non-metal alkoxide end group that has a formula —C-M-R$_x$—OR'$_y$ as defined above. Such a polymer can be prepared by, first providing (a) a solution of a copolymer of the main monomer and the compatibilizing monomer and (b) a nanoparticle precursor solution as described above. Second, the organometallic compound solution is mixed with the copolymer solution. The mixed solution is coated to form a thin layer and the thin layer is dried and annealed to form a material having a refractive index of greater than 1.65 at 400 nanometer. The annealing is preferably at a temperature of between 20 and 200° C., more preferably between 20 and 120° C. The time period for curing is preferably between 0.1 and 5 seconds, during which the humidity is maintained between 20 and 100 percent RH.

Particularly preferred polymers for high-refractive-index nanocomposites according to the present invention are polystyrene, copolymers with a silane compatibilizing monomer, PVK (poly(9-vinylcarbazole), and PDMS (polydimethylsiloxane).

Another optical property that can be controlled or increased by the presence of nanoparticles is birefringence. Commonly assigned copending application Ser. No. 11/208, 661 hereby incorporated by reference, discloses compositions in which the birefringence is within a certain range. Commonly assigned copending application Ser. No. 11/208, 974 hereby incorporated by reference, discloses compositions according to the present invention in which the birefringence is controlled relative to the polymer matrix in order to make a compensator or retarder film.

The barrier properties with respect to moisture, oxygen, and/or other environmental gases may also be altered to a desired end via the incorporation of nanoparticles.

Moreover, the metal oxide nanoparticle when homogeneously dispersed within the polymer may impart improved thermal, electrical, and/or mechanical properties compared to the polymer alone. For example, the mechanical properties of tensile strength and compressibility can be altered over those of the unfilled polymer, resulting in stronger and more durable materials compared to the polymer alone. Such nanocomposites can be used for structural, construction, and packaging applications.

EXAMPLES

Illustrative fabrication sequences of the in-situ nanocomposite synthesis and illustrative nanocomposite materials formed thereby are described. It is emphasized that the examples that follow are merely illustrative and other components, materials and sequences are contemplated.

In the following examples:

TIP is the nanoparticle precursor, titanium isopropoxide.
TiEtOH is the nanoparticle precursor, titanium ethoxide.
DCM is the organic solvent dichloromethane.
BuOH is the organic solvent butanol.
EtOH is the organic solvent ethanol.
THF is the organic solvent tetrahydrofuran.
TAC is the polymer cellulose triacetate.
PMMA is the polymer polymethylmethacrylate
PS is the polymer polystyrene.
PVK is the polymer PVK (poly(9-vinylcarbazole).
RH is the relative humidity.
TEM is transmission electron microscope or microscopy.

Synthesis of Copolymer P-1

Copolymer P-1 was obtained by the copolymerization of styrene and (acryloxypropy)1 trimethoxysilane (APTMS) monomers. Under Argon protection, a 50 ml flask was charged with 27.5 ml anhydrous toluene, 10 g (96 mmol) of styrene and 8.3 g (32 mmol) of APTMS. The solution was stirred for 5 minutes and 64 mg of 2,2'-azobis(2,4-dimethylpentanenitrile) was added to the solution. The solution was then heated to 60° C. for 20 hours, after which it was cooled to room temperature and precipitated into 1 liter heptane. The polymer precipitate was collected by filtration, re-dissolved into 50 ml toluene and re-precipitated into 1 liter heptane. The product was washed with heptane several times and dried at 1 mTorr vacuum overnight to yield 8.5 g (46%) of dried polymer.

Example 1

20 TIP: 80 PMMA

A solution consisting of 5 wt. % of polymethylmethacrylate (PMMA) in organic solvent DCM was prepared. Separately, a 5 wt. % solution of precursor TIP in DCM was prepared. The TIP solution was added to the PMMA solution dropwise under vigorous stirring. The resultant weight ratio of TIP to PMMA was about 20 to about 80. A clear solution was formed. The solution was coated using a doctor blade onto a glass support at room temperature in an ambient environment of 20% RH and 21° C. The film was dried in ambient condition for 2 hours. After drying, the film was further annealed at 100° C. under vacuum for 2 hours. A freestanding film of 20 micrometers was obtained by peeling the film from the glass support. The resulting film was optically transparent. The transmissivity was 91% for light of visible wavelengths. Illustratively, this transmissivity was achieved using light having a wavelength of 550 nm, although other visible wavelengths are substantially equally transmissive.

At this medium loading level of about 20% precursor, the distribution of the titanium oxide nanoparticles took on a morphology consisting of darkly contrasting nano-regions in the form of diffuse strands, which may be joined to each other in a web-like pattern or network, to form a random network throughout the matrix, as in FIG. 1. While the strands may extend out over several hundred nanometer in their length, or along the long dimension, these darkly contrasting thin strands were about 10-25 nm in width, i.e. in their short dimension in the TEM micrograph.

Example 2

50 TIP:50 TAC

A solution consisting of 18 wt. % precursor TIP in an organic solvent mixture of 50:50 DCM/BuOH by weight was added drop wise to a 10 wt. % cellulose triacetate (TAC) solution in DCM solvent under vigorous stirring. Stirring was continued for five minutes. The resulting weight ratio of TIP to TAC was 50:50. Following the addition of the TIP solution, sonication was utilized to remove bubbles. The resulting sonicated mixture was then applied at 180 g/m² wet coverage on bare polyester sheet at a controlled temperature of 21° C. using a doctor blade. The coated polyester sheet was immediately covered to slow the rate of drying using a prefabricated box After 60 minutes, the dried film was scored with a razor blade and lifted from the polyester carrier sheet. The resulting freestanding film was cured in an oven, at 70° C. and 95% RH for 12 hours. The resulting freestanding film was then further dried at 100° C. for 30 min.

The resultant film was optically clear. The transmittance was 92% for light of visible wavelengths. Illustratively, this transmissivity was achieved using light having a wavelength of 550 nm, although other visible wavelengths are substantially equally transmissive.

TEM analysis of this film showed that the Ti—O inclusions were present as thin web-like strands. Each was less than 50 nm in diameter, even though they may extend out to more than 100 nm in length, similar to that shown in FIG. 1.

Example 3

50 TIP: 50 P-1

A 27 wt. % solution of titanium isopropoxide (TIP precursor) was formed in butanol. Next, a 2% solution of polymer P-1 was formed in THF solvent. The TIP solution was next added to the P-1 solution dropwise under vigorous stirring. The resultant weight ratio of TIP to P-1 was about 50:50. A clear solution was formed. The solution was coated using a doctor blade onto a glass support at room temperature in an ambient condition of 50% RH and 21° C. The film was dried at an ambient condition of 50% RH and 21° C. and was further annealed at 100° C. under vacuum for about 2 hours. A freestanding nanocomposite film having titanium oxide nanoparticles and having a thickness of 28 μm was obtained when peeled from the glass support. The film was substantially optically clear.

Figure 2:
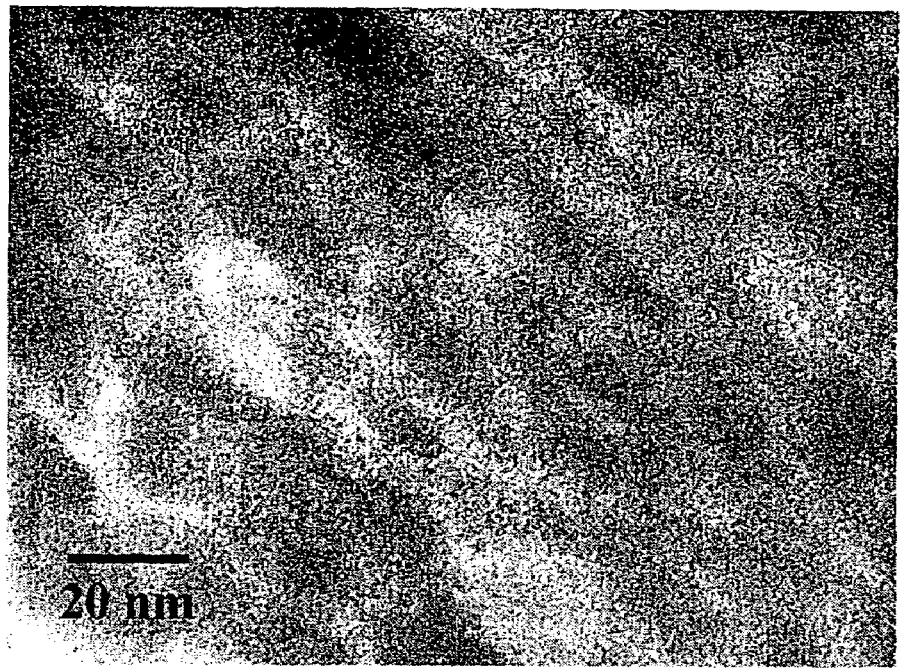
FIG. 2 is a transmission electron microscopy (TEM) image of a second embodiment of a nanocomposite material in accordance with Example 3 of the invention.

Under this high metal-oxide loading condition, the titanium-oxide nanoparticles appeared well dispersed in the copolymer matrix when analyzed by TEM using a thin microtomed section. However, the morphology of the titanium-oxide nanoparticles was a dense packing of block-like darkly contrasting nano-regions. These rectangular regions hade lengths that may be greater than 50 nm, but their shorter dimensions in the TEM micrograph were about 20 to 40 nm, as shown in FIG. 2. The contrast in each block was not very dark relative to the matrix, suggesting that they are likely intermixed with some amount of the P-1 polymer.

Comparative Example 1

10 TIP: 90 PS

A solution consisting of 15 wt. % of polystyrene (PS) in toluene was prepared. Next, precursor titanium isopropoxide (TIP) was added dropwise to the solution under vigorous stirring. The resultant weight ratio of TIP to PS was about 10 to about 90. A clear solution was formed. The solution was coated using a doctor blade on glass at room temperature in ambient environment of 20% RH. The coating was dried in ambient condition (20% RH at 21° C.) for 24 hours. The film was further annealed at 100° C. under vacuum for 2 hours. A freestanding nanocomposite film, with titanium oxide nanoparticles, having a thickness of 20 μm was peeled away from the glass support. The film was optically transparent. The transmissivity was 87% for light of visible wavelengths. Illustratively, this transmissivity was achieved using light having a wavelength of 550 nm, although other visible wavelengths are substantially equally transmissive.

Figure 3:
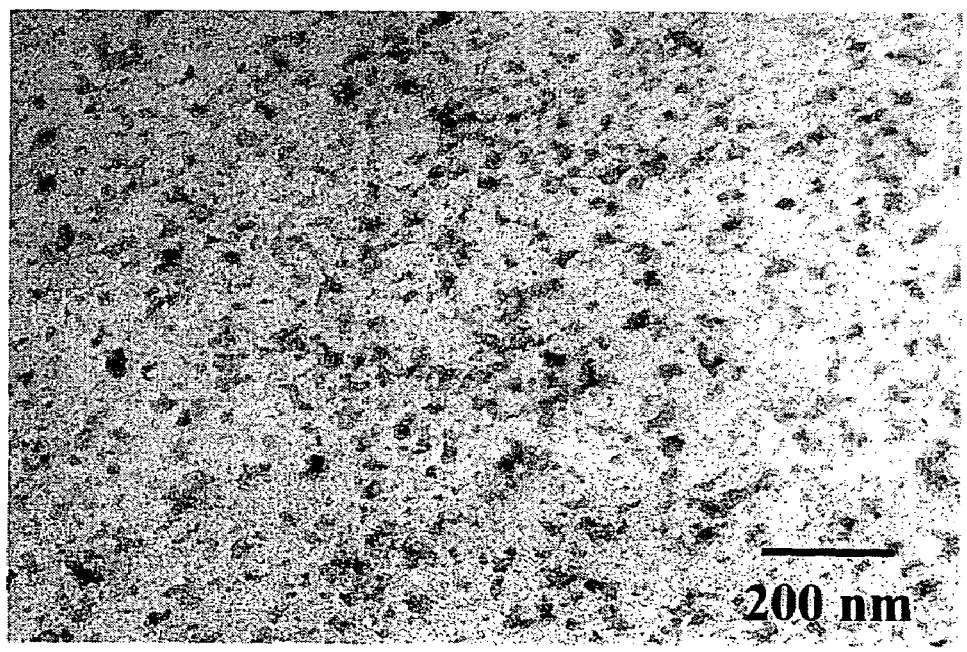
FIG. 3 is a transmission electron microscopy (TEM) image of a nanocomposite material in accordance with Comparative Example 1.

TEM analysis of a thin microtomed section showed that the titanium-oxide nanoparticles were homogenously distributed in the mixture with a morphology in which the dark contrast titanium-oxide rich regions were mainly less than 50 nm in size, as shown in FIG. 3. At such lower concentrations, the morphology of the nanoparticles is characterized by distinct particles rather than elongated strands or dense packing.

Comparative Example 2

10 TIP: 90 TAC:Water:Acid

Figure 4:
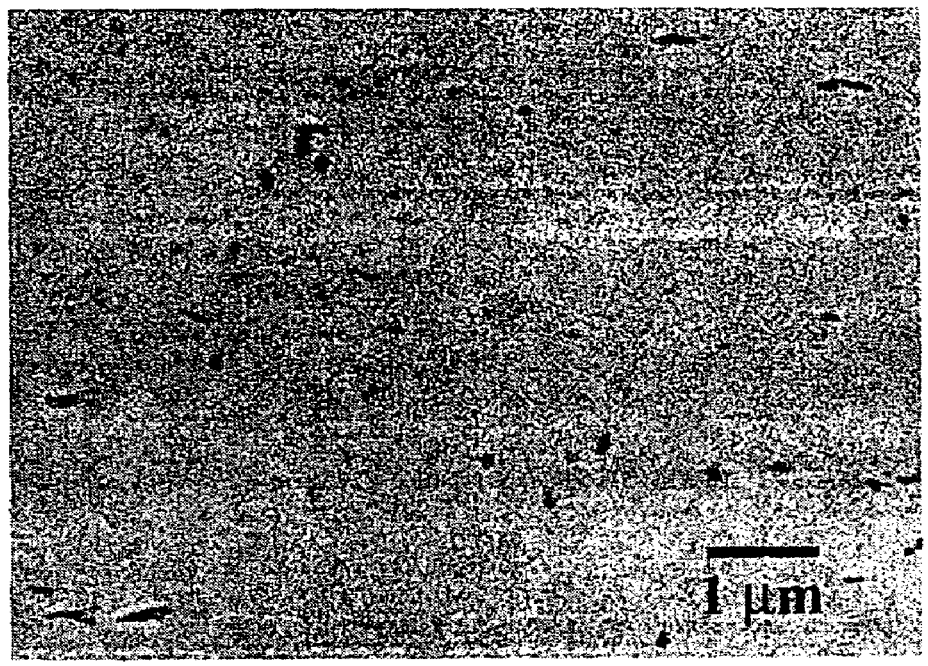
FIG. 4 is a transmission electron microscopy (TEM) image of a nanocomposite material in accordance with Comparative Example 2.

The precursor TIP was added to organic solvent DCM to form a 10 wt. % solution. To this solution, water (with 0.06 wt. % $HNO_3$) was added so that the weight ratio of $H_2O$:TIP was equal to 0.005:1. A slightly cloudy solution was formed. A 10 wt. % of TAC solution in DCM was made. Then the two solutions were mixed together. The resulting weight ratio of TIP to TAC was 10:90. The resulting solution was then sonicated to make it more homogenous. This mixture was then applied on bare polyester sheet at a controlled temperature of 21° C. and RH of 30% using a doctor blade. The coated polyester sheet was immediately covered to slow the rate of drying using a prefabricated box. The film contained nanoparticles as shown in FIG. 4.

TEM analysis revealed plate-like darkly contrasting regions, with the long direction usually parallel to the coating direction. These titanium oxide nanoparticle varied in length between 0.1 and 0.05 micron (100 nm to 500 nm) in the long direction and varied in thickness between about 50 and 100 nm in the short direction. Also, white particles were visible in the film. It is believed that the relatively large titanium-oxide particles had formed, prior to coating, because of the presence of acid catalyst and water.

Comparative Example 3

10 TiEtOH: 90 TAC

Figure 5:
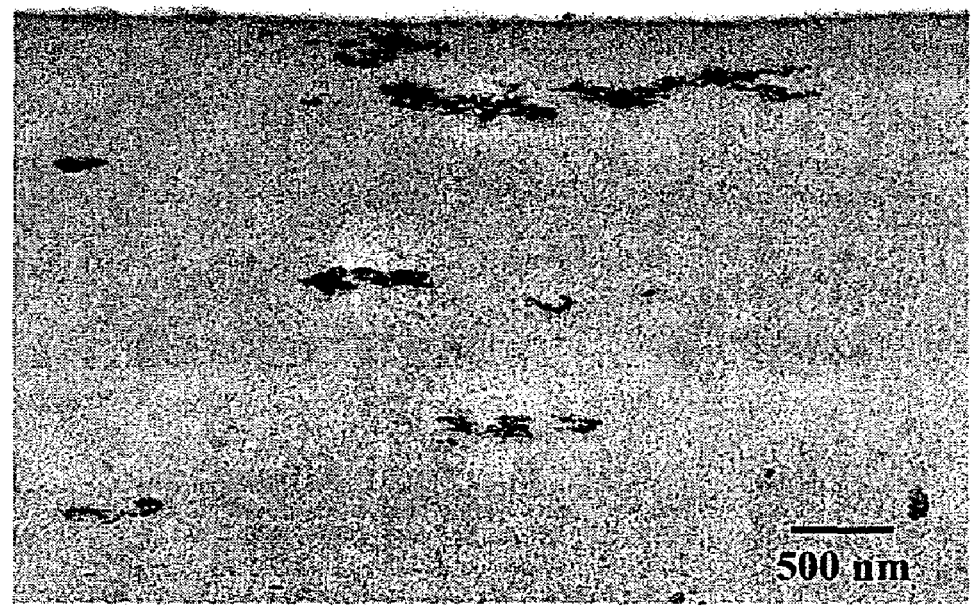
FIG. 5 is a transmission electron microscopy (TEM) image of a nanocomposite material in accordance with Comparative Example 3.

A solution was formed by adding 10 grams of titanium ethoxide (Gelest Co., PA) to 45 grams of ethanol (EtOH), after which 45 grams of the organic solvent DCM was added to the formed solution. A 10% by wt. solution of TAC in DCM was formed. Then the two solutions were mixed together. The resulting weight ratio of TiEtOH to TAC was 10:90. The solution was then sonicated to make it more homogenous. The resulting sonicated mixture was then applied on bare polyester sheet at a controlled temperature of 21° C. and RH of 30% using a doctor blade. The coated polyester sheet was immediately covered to slow the rate of drying using a prefabricated box. The film was fairly transparent but exhibited some haze. TEM analysis indicated the presence of linear, platelet-like darkly contrasting nano-regions. These nano-regions spanned more than 200 nm in length and had thicknesses of 50 to 100 nm, as shown in FIG. 5, and resembled the features described in Comparative Example 1. The TiEtOH solution, in a solvent mixture of 50DCM/50EtOH, was measured using a particle size analyzer, the 90Plus Particle Sizer (Brookhaven Instruments Corporation, N.Y.). There was significant particle growth with time, as shown in Table 1, compared to TIP solution in a solvent mixture of 50DCM/50BuOH, as used in Example 1.

TABLE 1

| Time | Particle Size (nm) for TiEtOH in EtOH/DCM | Particle Size (nm) for TIP in BuOH/DCM |
|---|---|---|
| 0 | 4.5 | 0 |
| 6 hours | 715 | 0 |
| 24 hours | 800 | 0 |

It is believed that TiEtOH is very reactive and reacts with water present in the ethanol solvent, resulting in relatively large particles forming in the solution prior to coating.

Comparative Example 4

$TiO_2$ particles in PS

A nanocomposite material was prepared using a known process for comparison with nanocomposite materials in accordance with the present invention. In particular, a nanoparticulate $TiO_2$ powder was obtained. The average particle size of the powder was 20 nm. A 5 wt. % $TiO_2$ suspension in toluene was made and a surfactant was added. The resultant suspension was put in with 1.25 mm zirconium silicate media and ball milled for a week. A colloid suspension was obtained. The suspension was then added to 5 wt. % PS solution in toluene under vigorous stirring. The resulting weight ratio of $TiO_2$ to PS was 5:95. The resulting suspension was spin coated at 1000 rpm on clean glass. The resultant coating was not transparent (i.e., white). This lack of transparency is indicative of nanoparticle agglomeration that is deleterious in many applications of the nanocomposite. Notably, all nanocomposite films of the inventive examples above were substantially transparent because the nanoparticle domain size was smaller than a fraction of the wavelength of light such that there was no significant scattering from the nanoparticles.

The Table below summarizes the results from Examples 1 to 3 and the Comparative Examples 1 to 4 in terms of nanoparticle loading as confirmed by TGA: thermal gravimetric analysis.

TABLE 2

| Example | Composition (Weight ratio) | Nanoparticle Loading (wt %) |
|---|---|---|
| 1 | PMMA/TIP (80/20) | 6.6 |
| 2 | TAC/TIP (50/50) | 21.9 |
| 3 | P-1/TIP (50/50) | 21.9 |
| Comparative 1 | PS/TIP (90/10) | 3 |
| Comparative 2 | TAC/TIP (90/10) (water) | 3 |
| Comparative 3 | TAC/TEO (90/10) | 3 |
| Comparative 4 | TAC/$TiO_2$ | |

Examples 4-6

This Example illustrates a high refractive index nanocomposite according to the present invention. The following materials were prepared:

Preparation of nanoparticle precursor solution N-1: In a 10 ml vial, 0.61 g of titanium IV isopropoxide (TIP) was added to 8.12 g of THF and 1.4 g of butanol. The solution SG-1 was mixed for 1 hour prior to further mixing.

Preparation of nanoparticle precursor solution N-2: In a 100 ml vial, 18.9 g of titanium IV isopropoxide (TIP) was added to 50.9 g of butanol. The solution SG-2 was mixed for 1 hour prior to further mixing.

Preparation of polymer solution S-1: In a 100 ml vial, 0.1 g of P-1 was dissolved in 4.9 grams of THF to form polymer solution PS-1.

Preparation of polymer solution PS-2: In a 100 ml vial, 3 g of P-1 was dissolved in 27 g of THF to form polymer solution PS-2.

Preparation of Coating Solutions 1 to 3: Coating Solutions were prepared by mixing polymer solutions and precursor solutions according to Table 3 below.

TABLE 3

| Coating Solution | Nanoparticle Precursor Solution (g) | | Polymer Solution (g) | |
|---|---|---|---|---|
| | N-1 | N-2 | S-1 | S-2 |
| 1 | 1 | | 1 | |
| 2 | | 20 | | 20 |
| 3 | 1 | | 0.25 | |

The casting of films according to the present invention was accomplished through either spin coating or blade coating. The coating conditions are listed in Table 4 below.

TABLE 4

| Film | Coating Solution | Spin Coating Speed (rpm) | Blade Coating Thickness (μm) |
|---|---|---|---|
| F-1 | 1 | 200 | |
| F-2 | 2 | | 280 |
| F-3 | 3 | 200 | |

Curing of the film: All the films were cured at 50° C./50% RH oven for overnight.

The films were then visually examined for clarity and transparency. Refractive index and thickness were measured using M-2000V® Spectroscopic Ellipsometer or, for thicker films, a profilometer. Table 5 lists the properties of the films.

TABLE 5

| Example | Film | Refractive Index at 460 nm | Thickness | Optical Clarity |
|---|---|---|---|---|
| E4 | F-1 | 1.73 | 1700 nm | Clear |
| E5 | F-2 | 1.7 | 28 μm | Clear |
| E6 | F-3 | 1.86 | 1400 nm | Clear |

Table 5 shows that all the examples have an index of refraction higher than 1.65 at 460 nm. They are shown to be optical transparent, flexible, and defect free for thicknesses up to 28 μm.

The invention claimed is:
1. A method of fabricating a nanocomposite material in the form of a film, the method comprising generating nanoparticles in-situ within a polymer matrix by:
  (a) forming a coating solution of a nanoparticle precursor and polymer dissolved in a non-aqueous carrier liquid comprising one or more organic solvents, wherein nanoparticle precursor is a condensation polymerizable reactive metal compound comprising a metal atom and at least two hydrolyzable leaving groups;
  (b) applying the coating solution onto a substrate to form a coating and then removing organic solvent from the coating, thereby forming a gel;

(c) converting the nanoparticle precursor into homogenously dispersed nanoparticles in a polymer matrix to form a nanocomposite; and (d) drying the nanocomposite to remove remaining organic solvent from the nanocomposite;

wherein the nanoparticles in the nanocomposite comprise a plurality of nanoparticles having a shorter dimension of not more than 50 nm, as determined by transmission electron microscopy, and characterized by a nanoparticle loading of from 6.6 to 21.9 weight %, wherein the refractive index of the nanoparticles is between 1.65 and 1.95 at 400 nm.

2. The method of claim 1 wherein components of the coating solution in step (a) are selected such that the nanoparticle precursor is essentially stable and unreacted prior to applying the coating solution onto the substrate.

3. The method of claim 1 wherein the gel in step (b) comprises the nanoparticle precursor and/or intermediate homogenously dissolved in a matrix of the polymer.

4. The method of claim 1 wherein the coating solution contains substantially no nanoparticles greater than 2 nm before coating.

5. The method of claim 1 wherein the carrier liquid comprises an organic solvent that is ethylene glycol or a compound having at least three carbon atoms and at least one hydroxy group.

6. The method of claim 5 wherein the organic solvent is an alcohol selected from the group consisting of butanol, isopropyl alcohol, and ethylene glycol.

7. The method of claim 1 wherein the carrier liquid is essentially free of methanol or ethanol.

8. The method of claim 1 wherein catalyst is essentially absent in the coating solution.

9. The method of claim 1 wherein water is not present in the coating solution in step (a) in an effective amount to hydrolyze the nanoparticle precursor.

10. The method of claim 9, wherein the coating solution comprises water in an amount of less than 25 weight percent, relative to the nanoparticle precursor.

11. The method of claim 9 wherein the coating solution comprises less than 0.2 weight percent water.

12. The method of claim 1, wherein the coating solution is coated onto a substrate in an environment having a controlled relative humidity of at least 2%.

13. The method of claim 12, wherein the controlled relative humidity is between 2 and 50 percent.

14. The method of claim 1, wherein the metal atom is a transition metal or a metal in Group 3B or 4B of the Periodic Table.

15. The method of claim 1, wherein the metal atom is selected from the group consisting of aluminum, titanium, tin, indium, and zirconium.

16. The method of claim 1, wherein a nanoparticle precursor comprising silicon is substantially absent from the coating solution used to make the nanocomposite.

17. The method of claim 1 wherein the nanoparticle precursor is a metal compound having having groups containing three to six carbon atoms.

18. The method of claim 1, wherein the nanoparticle precursor is a titanium alkoxide.

19. The method of claim 18, wherein the nanoparticle precursor is a titanium alkoxide in which the alkoxide has 3 to 6 carbon atoms.

20. The method of claim 1 wherein the amount of nanoparticle precursor in the coating solution is present in an amount of at least 5 weight percent relative to the total polymer.

21. The method of claim 1 wherein the polymer is a vinyl polymer.

22. The method of claim 1 wherein the polymer an acrylic or styrene polymer or copolymer.

23. The method of claim 1 wherein the polymer is a cellulosic polymer.

24. The method of claim 1 wherein the nanocomposite comprise nanoparticles characterized by indistinct boundaries and a gradient at the interface of the nanoparticles with the polymer matrix, indicating admixture of metal oxide with polymer in the nanoparticles, as determined by transmission electron microscopy.

* * * * *